US008109370B2

(12) United States Patent
Yamasaki (10) Patent No.: US 8,109,370 B2
(45) Date of Patent: Feb. 7, 2012

(54) ELECTRIC LINEAR-MOTION ACTUATOR AND ELECTRIC BRAKE ASSEMBLY

(75) Inventor: Tatsuya Yamasaki, Iwata (JP)

(73) Assignee: NTN Corporation, Osaka (JP)

( * ) Notice: Subject to any disclaimer, the term of this patent is extended or adjusted under 35 U.S.C. 154(b) by 915 days.

(21) Appl. No.: 11/989,231

(22) PCT Filed: Jul. 27, 2006

(86) PCT No.: PCT/JP2006/314839
§ 371 (c)(1),
(2), (4) Date: Mar. 19, 2008

(87) PCT Pub. No.: WO2007/013542
PCT Pub. Date: Feb. 1, 2007

(65) Prior Publication Data
US 2009/0095579 A1    Apr. 16, 2009

(30) Foreign Application Priority Data

Jul. 27, 2005    (JP) .................................. 2005-217429

(51) Int. Cl.
*F16H 25/22*    (2006.01)
(52) U.S. Cl. ..................................... 188/72.1; 74/424.92
(58) Field of Classification Search .................. 188/72.1, 188/72.3, 72.7, 72.8, 158, 162; 475/149, 475/150, 154, 156; 74/424.92
See application file for complete search history.

(56) References Cited

U.S. PATENT DOCUMENTS

| | | | | |
|---|---|---|---|---|
| 511,679 A * | 12/1893 | Buckley | ......................... | 254/385 |
| 3,861,221 A * | 1/1975 | Stanley | ............................ | 74/25 |
| 4,048,867 A * | 9/1977 | Saari | ........................... | 74/424.92 |
| 4,576,057 A * | 3/1986 | Saari | ........................... | 74/424.92 |
| 4,804,073 A * | 2/1989 | Taig et al. | .................... | 188/72.1 |
| 4,836,338 A * | 6/1989 | Taig | .............................. | 188/72.1 |

(Continued)

FOREIGN PATENT DOCUMENTS

JP    6-327190    11/1994
(Continued)

OTHER PUBLICATIONS

International Search Report issued Oct. 3, 2006, in the International (PCT) Application of which the present application is the U.S. National Stage.

*Primary Examiner* — Robert Siconolfi
*Assistant Examiner* — Stephen Bowes
(74) *Attorney, Agent, or Firm* — Wenderoth, Lind & Ponack, L.L.P.

(57) ABSTRACT

An actuator has planetary rollers disposed between a rotor shaft of an electric motor and an outer ring member fixed around the rotor shaft. The planetary rollers are rotated about the axis of the rotor shaft and about their own axes, thereby converting rotary motion of the rotor shaft to linear motion of the planetary rollers A helical groove is formed in the radially outer surface of each planetary roller in which a helical rib formed on the radially inner surface of the outer ring member is received. The helical groove has a pitch equal to that of the helical rib and a lead angle different from that of the helical rib. The amount of the linear motion of the planetary rollers relative to the amount of the rotary motion of the rotor shaft is determined by the difference in lead angle between the helical groove and the helical rib.

19 Claims, 7 Drawing Sheets

U.S. PATENT DOCUMENTS

| | | | |
|---|---|---|---|
| 4,850,457 A * | 7/1989 | Taig | 188/72.1 |
| 4,964,314 A * | 10/1990 | Wilkes | 74/424.92 |
| 5,788,023 A | 8/1998 | Schoner et al. | |
| 5,809,837 A * | 9/1998 | Shaffer | 74/424.92 |
| 6,315,086 B1 * | 11/2001 | Schmitt et al. | 188/72.7 |

FOREIGN PATENT DOCUMENTS

| | | |
|---|---|---|
| JP | 8-338461 | 12/1996 |
| JP | 2003-343620 | 12/2003 |

* cited by examiner

ELECTRIC LINEAR-MOTION ACTUATOR AND ELECTRIC BRAKE ASSEMBLY

TECHNICAL FIELD

The present invention relates to an electric linear-motion actuator for converting the rotary motion of an electric motor to a linear motion, thereby linearly driving a member to be driven, and an electric brake assembly using the electric linear-motion actuator to press a brake member against a member to be braked.

BACKGROUND ART

Many electric linear-motion actuators for converting the rotary motion of an electric motor to a linear motion, thereby linearly driving a member to be driven, include a ball-screw mechanism or a ball-ramp mechanism as their motion converter mechanism. Also, in order to obtain large linear driving force with a small-capacity electric motor, many of such actuators include a speed reducing mechanism such as a planetary gear speed reducing mechanism (see e.g. JP patent publication 6-327190A (FIGS. 1 and 5)).

On the other hand, many of the existing vehicle brake assemblies are hydraulic ones. But with the recent introduction of sophisticated brake control systems such as anti-lock brake systems (ABS), electric brake assemblies are gathering attention because they can perform such sophisticated control without the need for complicated hydraulic circuits and they can be designed compactly. Such electric brake assemblies include an electric motor which is actuated in response to e.g. signals indicating that the brake pedal is depressed, and an electric linear-motion actuator as described above which is mounted in a caliper body for pressing a brake member against the member to be braked when the motor is actuated (see e.g. JP patent publication 2003-343620A (FIG. 1)).

Ordinarily, electric brake assemblies are mounted on a vehicle each under one of the springs of the vehicle, and thus, it is desired that such brake assemblies operate stably under the influence of vibrations transmitted from the ground, and can be designed compactly.

SUMMARY OF THE INVENTION

Ball-screw mechanisms and ball-ramp mechanisms used in such conventional electric linear-motion actuators have the ability to increase power to some extent by motion converting means that moves along a thread having a lead or an inclined cam surface, but cannot increase power to a level required e.g. in electric brake systems. That is, while power can be increased by reducing the lead angle of the thread or the inclination angle of the cam surface, in the case of ball-screw mechanisms, if the lead angle of the thread is reduced, the ball diameter decreases, so that the load capacity decreases. In the case of ball-ramp mechanisms, if the inclination angle of the cam surface is reduced, it is difficult to ensure a sufficient stroke of the linear motion.

Thus, with electric linear-motion actuators using such motion converting means, a separate speed reducing mechanism as described above is mounted to increase the driving force. But if a separate speed reducing mechanism such as a planetary gear speed reducing mechanism is mounted, it becomes difficult to compactly design the electric linear-motion actuator.

In order to avoid this problem, the present applicant has proposed, as an electric linear-motion actuator capable of sufficiently increasing power without mounting a separate speed reducing mechanism, a mechanism including planetary rollers disposed between the radially outer surface of the rotor shaft of an electric motor and the radially inner surface of an outer ring member fixed in position around the radially outer surface of the rotor shaft such that when the rotor shaft rotates, the planetary rollers rotate about the axis of the rotor shaft while simultaneously rotating about their own axes. A helical rib is formed on the radially outer surface of the rotor shaft or the radially inner surface of the outer ring member, while circumferential grooves are formed in the radially outer surface of each planetary roller at pitches equal to the pitches of the helical rib. The helical rib is engaged in the circumferential grooves of the respective planetary rollers so that when the planetary rollers rotate about the axis of the rotor shaft while simultaneously rotating about their own axes, the planetary rollers also move in the axial direction of the rotor shaft relative to the rotor shaft. Thus, this mechanism can convert the rotary motion of the rotor shaft to the linear motion of the planetary rollers (JP patent application 2005-6714).

With this arrangement, because circumferential grooves are formed in the radially outer surface of each planetary roller for engaging the helical rib, the amount of the linear motion of the planetary rollers relative to amount of the rotary motion of the rotor shaft, i.e. the reduction rate of the linear motion is determined by the lead angle of the helical rib only. Thus, by reducing the lead angle, it is possible to correspondingly increase the reduction rate of the linear motion and thus the linear driving force. But there is a limit below which the lead angle of the helical rib cannot be reduced. Thus, there is a limit above which the linear driving cannot be increased.

An object of the present invention is therefore to increase the linear driving force in a linear-motion actuator of the type in which the rotary motion of the rotor shaft of an electric motor is converted to the linear motion of planetary rollers disposed between the rotor shaft and an outer ring member by rotating the planetary rollers about the axis of the rotor shaft and also about their own axes.

In order to achieve this object, the present invention provides an electric linear-motion actuator for linearly driving a member to be driven by converting the rotary motion of an electric motor to a linear motion, characterized in that a plurality of planetary rollers are disposed between a radially outer surface of a rotor shaft of the electric motor and a radially inner surface of an outer ring member fixed in position around the radially outer surface of the rotor shaft such that when the rotor shaft rotates, the planetary rollers rotate about the axis of the rotor shaft while simultaneously rotating about their own axes, that a helical rib is formed on one of the radially outer surface of the rotor shaft and the radially inner surface of the outer ring member, and that a helical groove is formed in a radially outer surface of each of the planetary rollers, the helical rib being in engagement with the helical grooves of the respective planetary rollers, the helical grooves being equal in pitch to the helical rib, and different in lead angle from the helical rib, whereby when the planetary rollers rotate about the rotor shaft while simultaneously rotating about their own axes, the planetary rollers move in an axial direction of the rotor shaft relative to the rotor shaft, thereby converting the rotary motion of the rotor shaft to a linear motion of the planetary rollers.

By forming the helical groove in the radially outer surface of each planetary roller which is equal in pitch to the helical rib and different in lead angle from the helical rib, and in which the helical rib is engaged, the linear movement of the planetary rollers relative to the rotary motion of the rotor shaft is determined by the difference in lead angle between the helical grooves and the helical rib. This makes it possible to increase the reduction rate of the linear motion and thus the linear driving force.

By providing a plurality of the helical ribs, and/or a plurality of the helical grooves in each planetary roller, it is possible to more freely determine the difference in lead angle between the helical rib or ribs and the helical groove or grooves.

The at least one helical rib may comprise a rib-forming member received in and fixed to a helical groove formed in one of the radially outer surface of the rotor shaft and the radially inner surface of the outer ring member. Such a helical rib can be easily formed.

By providing means for restricting end surfaces of the rib-forming member, which is fixed to the helical groove, it is possible to prevent separation of the rib-forming member, thereby making it possible to form the helical rib, which is configured to engage in the helical grooves formed in the planetary rollers, to design dimensions.

Means for allowing the rotor shaft of the electric motor to be manually rotated may be provided so that if the electric motor fails, the linear pressing force of the planetary rollers can be released by manually turning the rotor shaft.

The present invention also provides an electric brake assembly including an electric linear-motion actuator for converting the rotary motion of an electric motor to a linear motion, thereby linearly driving a brake member, and pressing the brake member against a member to be braked, wherein the electric linear-motion actuator is the above-described electric linear-motion actuator. With this arrangement, the brakes can be applied with a larger linear driving force.

With the electric linear-motion actuator according to the present invention, by forming the helical groove in the radially outer surface of each planetary roller which is equal in pitch to the helical rib and different in lead angle from the helical rib, and in which the helical rib is engaged, the amount of the linear motion of the planetary rollers relative to the amount of the rotary motion of the rotor shaft is determined by the difference in lead angle between the helical grooves and the helical rib. Thus, it is possible to increase the linear driving force.

By providing a plurality of the helical ribs, and/or a plurality of the helical grooves in each planetary roller, it is possible to more freely determine the difference in lead angle between the helical rib or ribs and the helical groove or grooves.

The at least one helical rib may comprise a rib-forming member received in and fixed to a helical groove formed in one of the radially outer surface of the rotor shaft and the radially inner surface of the outer ring member. Such a helical rib can be easily formed.

By providing means for restricting end surfaces of the rib-forming member, which is fixed to the helical groove, it is possible to prevent separation of the rib-forming member, thereby making it possible to form the helical rib, which is configured to engage in the helical grooves formed in the planetary rollers, to design dimensions.

Means for allowing the rotor shaft of the electric motor to be manually rotated may be provided so that if the electric motor fails, the linear pressing force of the planetary rollers can be released by manually turning the rotor shaft.

Since the above-described electric linear-motion actuator is used as the electric linear-motion actuator in the electric brake assembly according to the present invention, the brakes can be applied with a larger linear driving force.

DETAILED DESCRIPTION OF THE INVENTION

Figure 1:
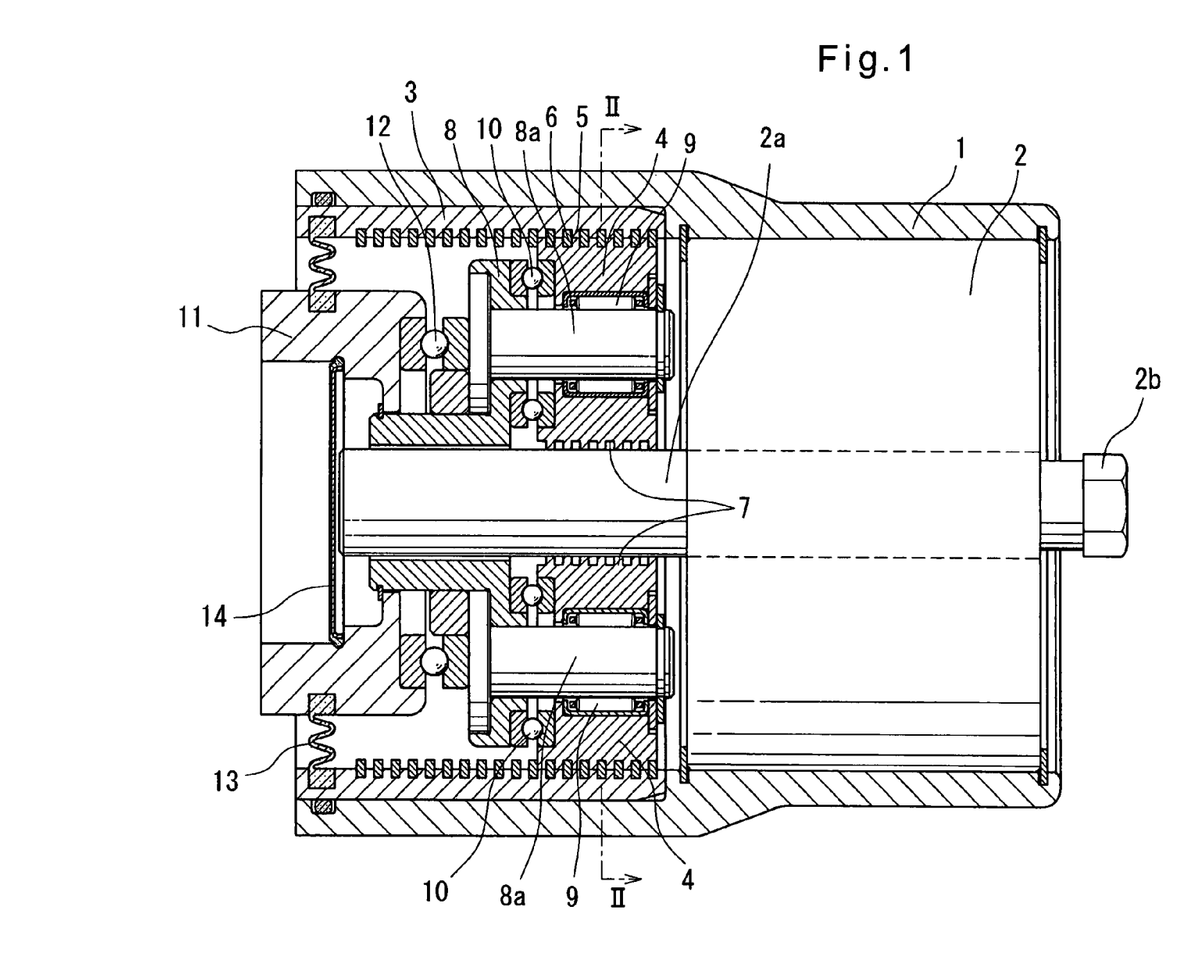
FIG. 1 is a vertical sectional view of an electric linear-motion actuator according to a first embodiment.
Figure 2:
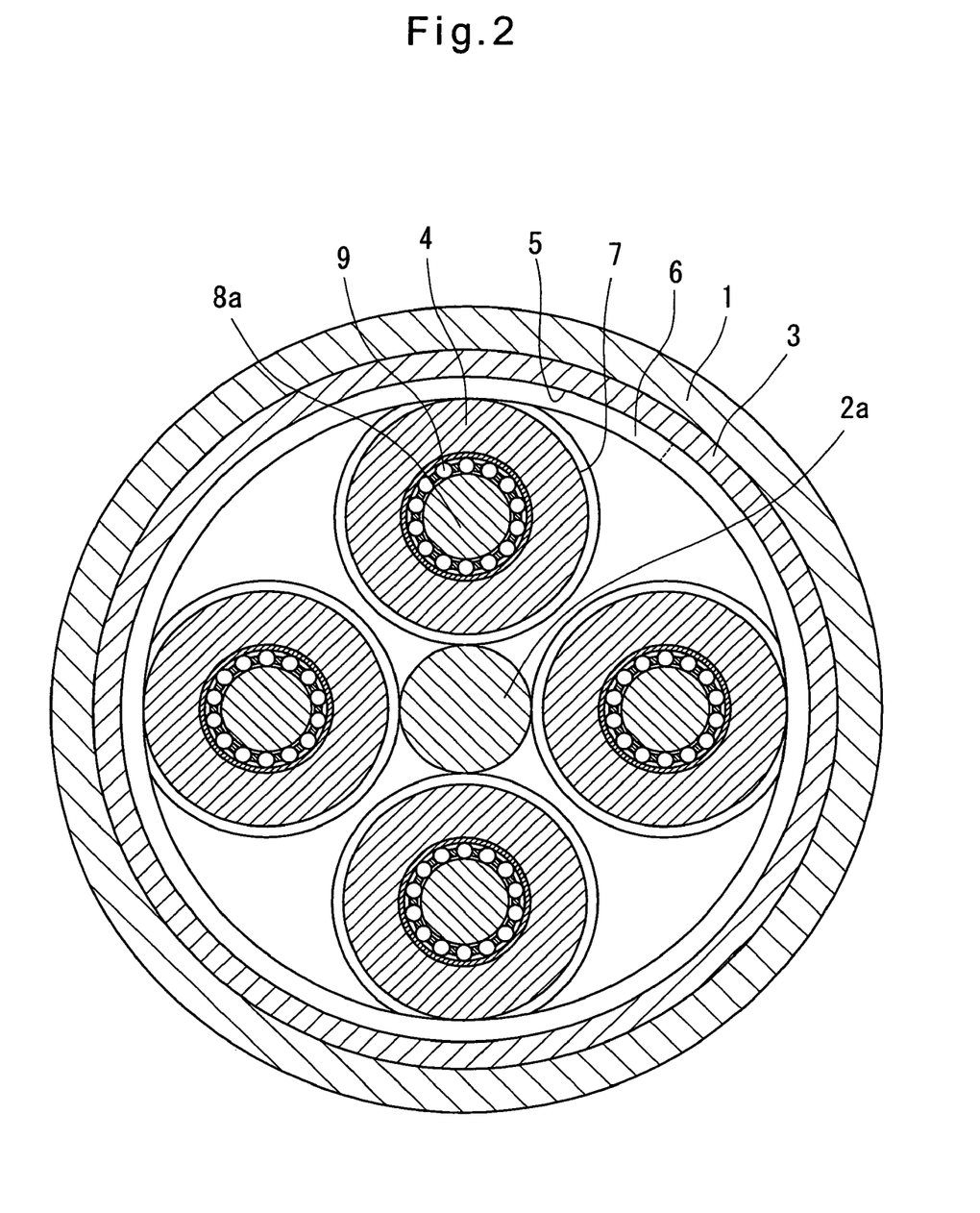
FIG. 2 is a sectional view taken along line II-II of FIG. 1.
Figure 3:
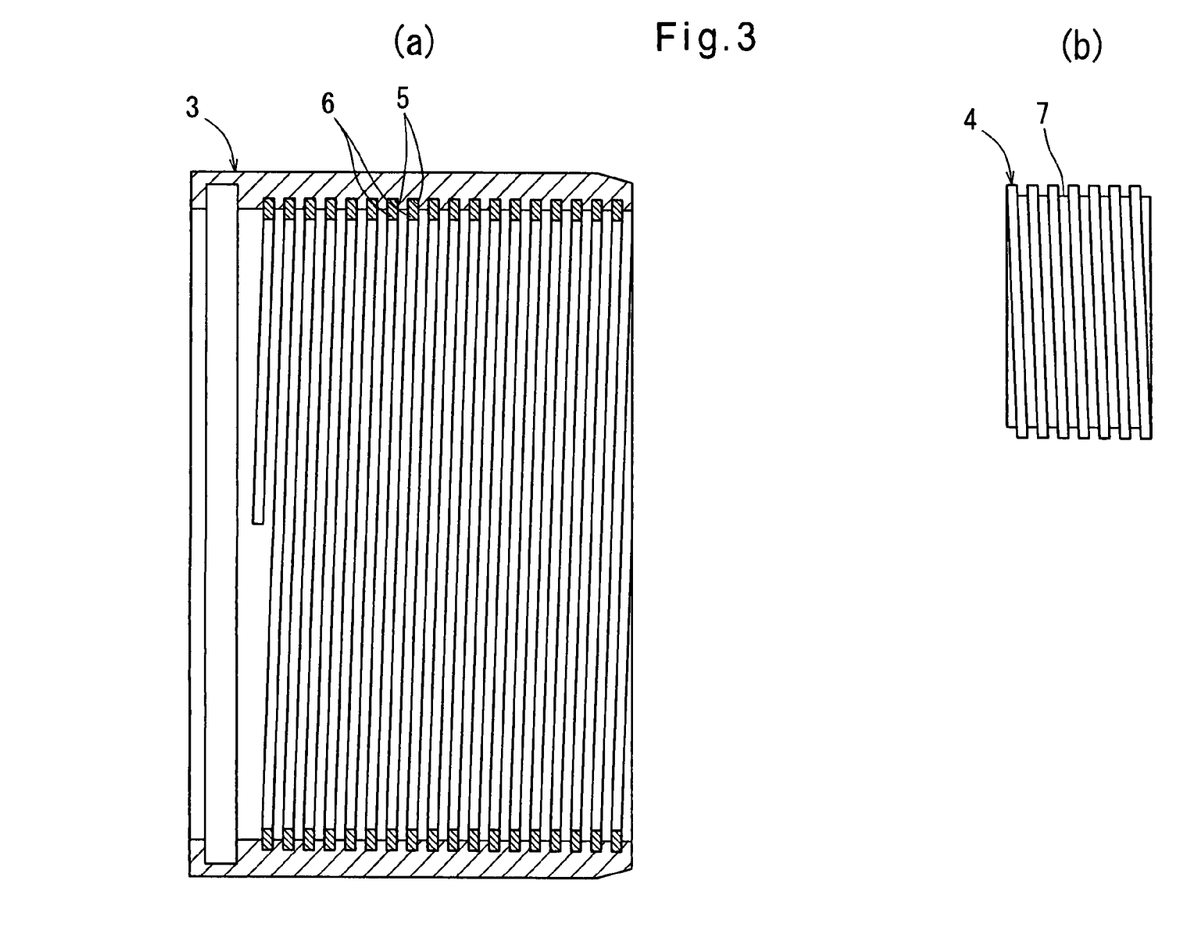
FIGS. 3a and 3b are front views of an outer ring member and a planetary roller, showing their helical rib and helical groove, respectively.

The embodiments of the invention are now described with reference to the drawings. FIGS. 1 to 4 show the first embodiment. As shown in FIGS. 1 and 2, the electric linear-motion actuator of this embodiment includes an electric motor 2 mounted in a cylindrical casing 1 at one end thereof, and an outer ring member 3 mounted in the casing 1 at the other end. Between the radially inner surface of the outer ring member 3 and the radially outer surface of a rotor shaft 2a of the electric motor 2, four planetary rollers 4 are disposed with a negative gap so that the planetary rollers 4 rotate about the axis of the shaft 2a while simultaneously rotating about their own axes. The rotor shaft 2a protrudes from the end of the casing 1 opposite to its end where the planetary rollers 4 are mounted. At the protruding end thereof, the shaft 2a has a hexagonal head 2b so that the shaft 2a can be rotated with e.g. a wrench. Hardening treatment is applied to the radially outer surfaces of the planetary rollers 4, and the radially inner surface of the outer ring member 3 and the radially outer surface of the rotor shaft 2a with which the planetary rollers 4 are in rolling contact, for improved wear resistance. These surfaces, which are in rolling contact with each other, are lubricated with grease.

As shown in FIG. 3(a), two helical grooves 5 are formed in the portion of the radially inner surface of the outer ring member 3 with which the planetary rollers 4 are in rolling contact. Rib-forming members 6 having a square section are each received in and fixed to each of the helical grooves 5 to form two helical ribs on the radially inner surface of the outer ring member 3. As shown in FIG. 3(b), in the radially outer surface of each planetary roller 4, a single helical groove 7 is formed which is equal in pitch to the pitch between the two helical ribs and different in lead angle from the two helical ribs. By providing the two helical ribs on the outer ring member 3, it is possible to more freely determine the difference in lead angle of the helical groove 7 of each planetary roller 4 from the helical ribs. When comparing FIG. 3(a) with 3(b), it appears that the helical ribs and the helical groove 7 extend in opposite directions to each other. But actually, they extend in the same direction because the helical ribs are threadedly engaged in the helical groove at the backside of its portion shown in FIG. 3(b).

Figure 4:
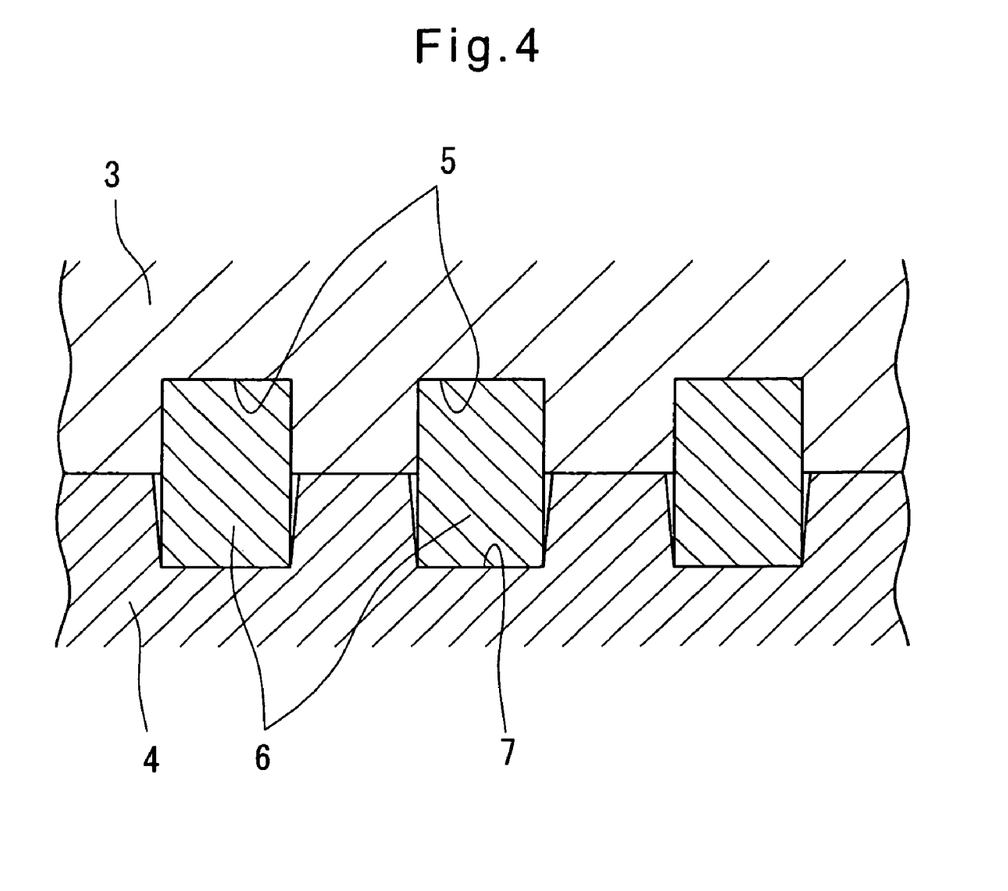
FIG. 4 is an enlarged sectional view of portions of the outer ring member and the planetary roller where their helical rib and helical groove are in threaded engagement with each other.

As shown in FIG. 4, the helical groove 7 has a trapezoidal cross-section so that the helical ribs, which have a different lead angle from the helical groove 7 and which are formed of the rib-forming members 6 having a square cross-section, can be smoothly engaged in the helical groove 7. Thus, due to the difference in lead angle between the helical ribs and the helical grooves 7 of the planetary rollers 4, when the planetary rollers 4 rotate about the axis of the shaft 2a while simultaneously rotating about their own axes with their helical grooves 7 in threaded engagement with the helical ribs of the outer ring member 3, the planetary rollers 4 linearly move in the axial direction.

As shown in FIGS. 1 and 2, the planetary rollers 4 are each rotatably mounted through a needle bearing 9 on one of support shafts 8a of a carrier 8 fitted on the rotor shaft 2a. The planetary rollers 4 are also supported by the carrier 8 through thrust ball bearings 10 so as to be rotatable about their axes relative to the carrier 8. The carrier 8, which rotates about the axis of the shaft 2a together with the planetary rollers 4, supports a linear drive member 11 through a thrust ball bearing 12. Thus, the linear motion of the planetary rollers 4 is transmitted to the linear drive member 11 through the carrier 8. The interior of the actuator is sealed by a boot 13 mounted between the radially outer surface of the linear drive member 11 and the outer ring member 3, and by a film seal 14 fitted in the radially inner surface of the linear drive member 11, through which the rotor shaft 2a extends.

Figure 5:
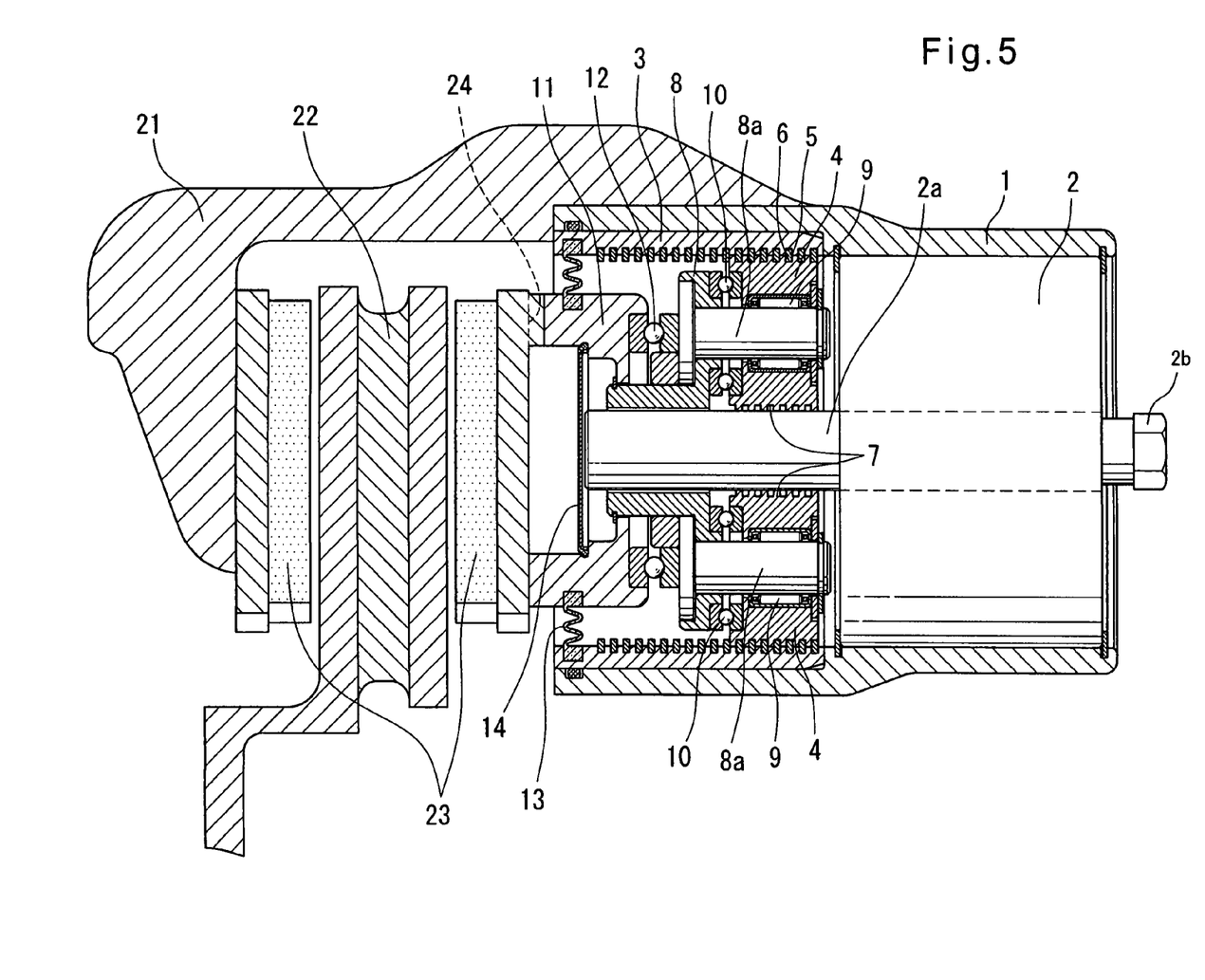
FIG. 5 is a vertical sectional view of an electric brake assembly in which the electric linear-motion actuator of FIG. 1 is used.

FIG. 5 shows an electric brake assembly in which the above-described electric linear-motion actuator is used. The electric brake assembly shown is a disc brake including a caliper body 21, a disc rotor 22, i.e. a member to be braked, and brake pads 23 provided in the caliper body 21 and each facing one side of the rotor 22. The casing 1 of the electric linear-motion actuator is fixed to the caliper body 21. The linear drive member 11 presses one of the brake pads 23 against the disc rotor 22. The linear drive member 11 is rotationally fixed to the one of the brake pads 23 by means of a key. With this electric brake assembly, if the electric motor 2 fails, it is possible to release the braking force by engaging the hexagonal head 2b of the rotor shaft 2a with e.g. a wrench and manually turning the shaft 2a.

Figure 6:
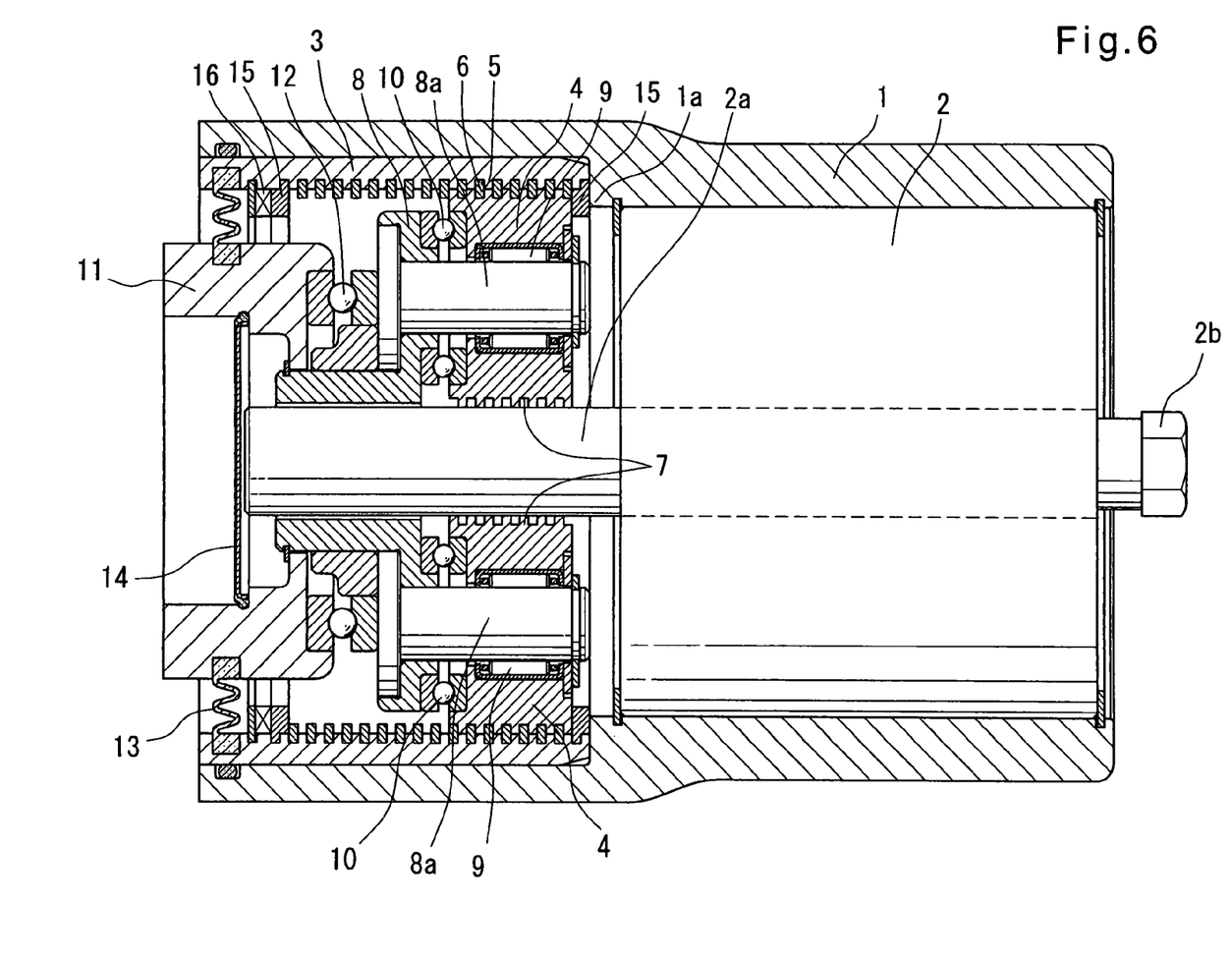
FIG. 6 is a vertical sectional view of an electric linear-motion actuator according to a second embodiment.

FIG. 6 shows the second embodiment. The electric linear-motion actuator of this embodiment is basically of the same structure as the first embodiment, and differs in that a single helical groove 5 is formed in the radially inner surface of the outer ring member 3 in which a rib-forming member 6 having a square cross-section is fixedly received to form a single helical rib on the radially inner surface of the outer ring member 3, and that the end surfaces of the rib-forming member 6 are restricted by stoppers 15 in threaded engagement with the radially inner surface of the outer ring member 3, respectively. To prevent loosening of the stoppers 15, the stopper 15 restricting one of the end surfaces of the rib-forming member 6 nearer to the electric motor 2 has its back pressed against a shoulder 1a of the casing 1, while the other stopper 15 has its back pressed by a spring member 16. By restricting the end surfaces of the rib-forming member 6, the stoppers 15 prevent separation of the rib-forming member 6 from the surface of the helical groove 5.

Figure 7:
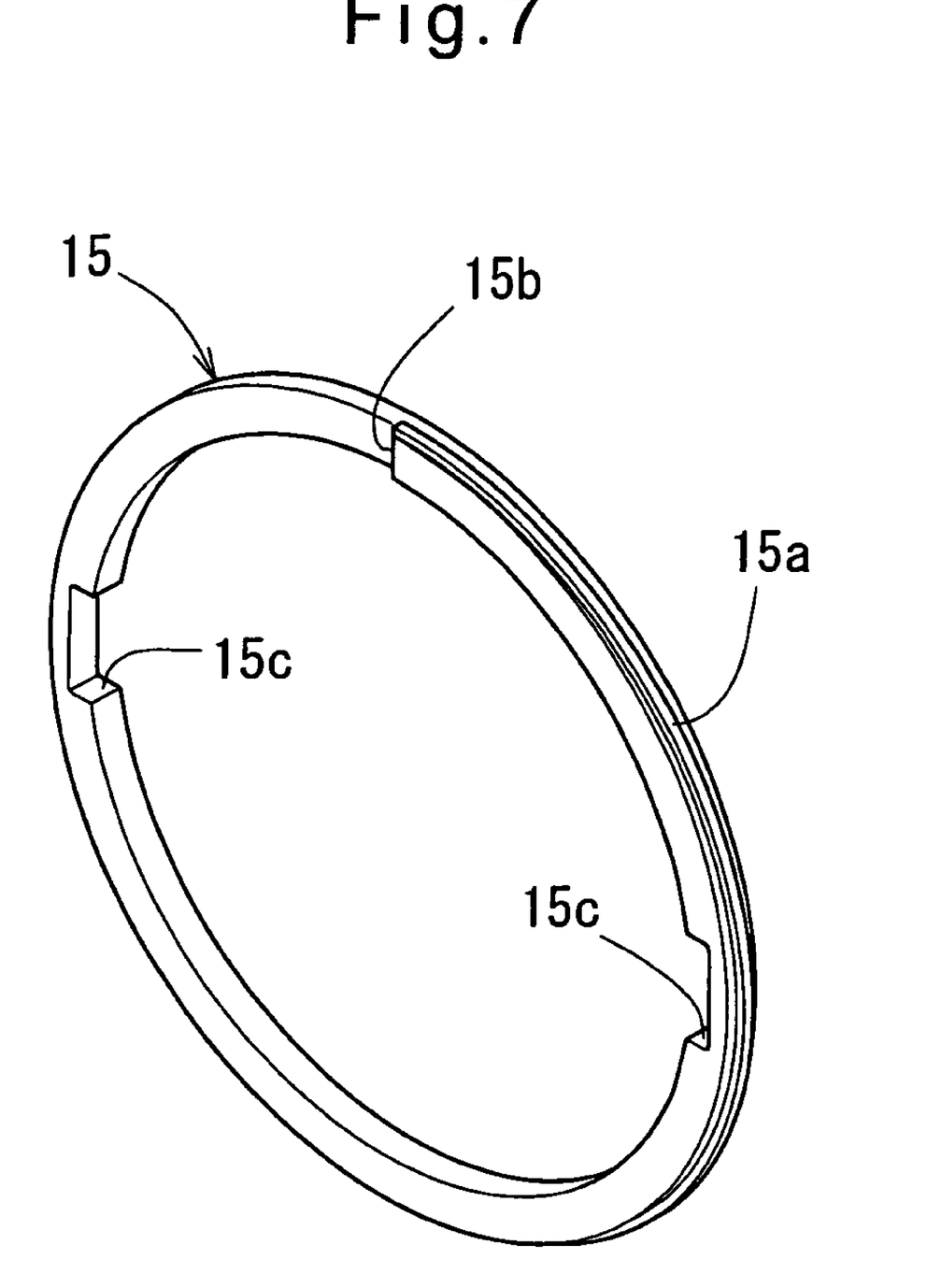
FIG. 7 is a perspective view of a stopper of FIG. 6.

As shown in FIG. 7, the stoppers 15 are ring-shaped members each having on its radially outer surface an external thread 15a that threadedly engages the radially inner surface of the outer ring member 3, and on one side thereof a shoulder 15b that abuts one of the end surfaces of the rib-forming member 6. Each of the stoppers 15 is further formed with cutouts 15c in its radially inner surface in which a tightening tool is engageable.

In the embodiments, one or two helical ribs are formed on the outer ring member, while a single helical groove is formed in each planetary roller. But the numbers of helical ribs and helical grooves can be freely determined depending on the desired difference in lead angle therebetween.

The electric linear-motion actuator according to this invention can be used in devices other than electric brake assemblies, too.

The invention claimed is:

1. An electric linear-motion actuator for linearly driving a member to be driven by converting the rotary motion of an electric motor to a linear motion, the electric linear-motion actuator comprising:
   a motor rotor shaft having an axis;
   an outer ring member mounted around the radially outer surface of the rotor shaft; and
   a planetary roller carrier rotatable about the axis of the rotor shaft; and
   a plurality of planetary rollers supported by said carrier for rotation individually about planetary roller axes and for rotation together around the axis of the rotor shaft, said planetary rollers being disposed between a radially outer surface of the rotor shaft and a radially inner surface of the outer ring member such that, when the rotor shaft rotates, the planetary rollers rotate about the axis of the rotor shaft while simultaneously rotating about the planetary roller axes, respectively;
   wherein a helical rib is formed on one of the radially outer surface of the rotor shaft and the radially inner surface of the outer ring member;
   wherein a helical groove is formed in a radially outer surface of each of the planetary rollers, said helical rib being in engagement with the helical grooves of the respective planetary rollers, said helical grooves being equal in pitch to said helical rib, and different in lead angle from said helical rib, such that, when said planetary rollers rotate about said rotor shaft while simultaneously rotating about the planetary roller axes, said planetary rollers move in an axial direction of the rotor shaft relative to the rotor shaft, thereby converting the rotary motion of the rotor shaft to a linear motion of the planetary rollers;
   wherein said planetary rollers and said planetary roller carrier are arranged to move together axially while the planetary rollers are rotatable with respect to said planetary roller carrier;
   wherein rolling thrust bearings are provided between said planetary rollers and said planetary roller carrier to support the planetary roller carrier relative to said planetary rollers; and
   wherein said helical grooves extend in the same helical direction as said helical rib but at a different lead angle than said helical rib.

2. The electric linear-motion actuator of claim 1 wherein there are a plurality of said helical ribs, and/or a plurality of said helical grooves in each planetary roller.

3. The electric linear-motion actuator of claim 1 wherein said helical rib comprises a rib-forming member received in and fixed to a helical groove formed in one of the radially outer surface of the rotor shaft and the radially inner surface of the outer ring member.

4. The electric linear-motion actuator of claim 3 further comprising means for restricting end surfaces of said rib-forming member, which is fixed to the helical groove.

5. The electric linear-motion actuator of claim 1 further comprising means for allowing the rotor shaft of the electric motor to be manually rotated.

6. An electric brake assembly including an electric linear-motion actuator for converting the rotary motion of an electric motor to a linear motion, thereby linearly driving a brake member, and pressing the brake member against a member to be braked, characterized in that said electric linear-motion actuator is the electric linear-motion actuator claimed in claim 1.

7. The electric linear-motion actuator of claim 2 wherein said at least one helical rib comprises a rib-forming member received in and fixed to a helical groove formed in one of the radially outer surface of the rotor shaft and the radially inner surface of the outer ring member.

8. The electric linear-motion actuator of claim 2 further comprising means for allowing the rotor shaft of the electric motor to be manually rotated.

9. The electric linear-motion actuator of claim 3 further comprising means for allowing the rotor shaft of the electric motor to be manually rotated.

10. The electric linear-motion actuator of claim 4 further comprising means for allowing the rotor shaft of the electric motor to be manually rotated.

11. An electric brake assembly including an electric linear-motion actuator for converting the rotary motion of an electric motor to a linear motion, thereby linearly driving a brake member, and pressing the brake member against a member to be braked, wherein said electric linear-motion actuator is the electric linear-motion actuator claimed in claim 2.

12. An electric brake assembly including an electric linear-motion actuator for converting the rotary motion of an electric motor to a linear motion, thereby linearly driving a brake member, and pressing the brake member against a member to be braked, wherein said electric linear-motion actuator is the electric linear-motion actuator claimed in claim 3.

13. An electric brake assembly including an electric linear-motion actuator for converting the rotary motion of an electric motor to a linear motion, thereby linearly driving a brake member, and pressing the brake member against a member to be braked, wherein said electric linear-motion actuator is the electric linear-motion actuator claimed in claim 4.

14. An electric brake assembly including an electric linear-motion actuator for converting the rotary motion of an electric motor to a linear motion, thereby linearly driving a brake member, and pressing the brake member against a member to be braked, wherein said electric linear-motion actuator is the electric linear-motion actuator claimed in claim 5.

15. The electric linear-motion actuator of claim 1, wherein the rolling thrust bearings are constituted by ball bearings.

16. The electric linear-motion actuator of claim 3, wherein the helical groove is provided in the outer ring member, and stoppers are engaged with the radially inner surface of the outer ring member and arranged to restrict end surfaces of the rib-forming member so as to prevent separation of the rib-forming member from a surface of the helical groove.

17. The electric linear-motion actuator of claim 1, further comprising a case housing said rotor shaft, said outer ring member, said carrier, and said planetary rollers, and wherein said rotor shaft protrudes from an end of said case and has an end portion configured to be engaged by a tool outside said case to allow for manual rotation of said rotor shaft.

18. The electric linear-motion actuator of claim 1, further comprising a linear drive member supported relative to said carrier by additional thrust rolling bearings.

19. The electric linear-motion actuator of claim 18, further comprising a sealing boot secured between said outer ring member and said linear drive member.

* * * * *